United States Patent [19]

Browne

[11] Patent Number: 4,691,505
[45] Date of Patent: Sep. 8, 1987

[54] STALK SHREDDER FOR SELF-PROPELLED COTTON STRIPPER

[75] Inventor: Donald V. Browne, Colorado City, Tex.

[73] Assignee: Browne Brothers, Inc., Colorado City, Tex.

[21] Appl. No.: 870,723

[22] Filed: Jun. 4, 1986

[51] Int. Cl.⁴ .......................................... A01O 49/00
[52] U.S. Cl. ........................................ 56/503; 56/500; 56/28
[58] Field of Search .................... 56/13.3, 28, 30, 500, 56/503, 504, 505, 6, 53, 15.2, 60; 172/27, 28, 298, 297, 73, 59; 171/5

[56] References Cited

U.S. PATENT DOCUMENTS

| | | | |
|---|---|---|---|
| 2,632,988 | 3/1953 | Pollard et al. | 56/53 |
| 2,952,109 | 9/1960 | Lambert | 56/53 |
| 3,358,430 | 12/1967 | Attebery | 56/28 |
| 3,387,437 | 6/1968 | Owen | 56/30 |
| 3,600,877 | 8/1971 | McCrary | 56/13.7 |
| 3,762,137 | 10/1973 | Venetto | 56/13.3 |
| 3,796,028 | 3/1974 | Federspiel | 56/15.2 |
| 4,135,349 | 1/1979 | Schwertner | 56/503 |
| 4,258,535 | 3/1981 | Jones et al. | 56/503 |
| 4,397,136 | 8/1983 | McLeod | 56/503 |
| 4,461,139 | 7/1984 | Hernandez | 56/14.5 |

FOREIGN PATENT DOCUMENTS 2011976  9/1971  Fed. Rep. of Germany .......... 56/53

Primary Examiner—Robert P. Swiatek
Assistant Examiner—John Weiss
Attorney, Agent, or Firm—Wendell Coffee

[57] ABSTRACT

Individual stalk shredder units are mounted beneath the frame between the wheels of a cotton harvester. The shredder units are connected to a shredder bar which is attached to the frame by support arms. The height of shredder bar in use is regulated by gauge wheels. The shredder bar is raised and lowered by a power lift mechanism.

3 Claims, 6 Drawing Figures

STALK SHREDDER FOR SELF-PROPELLED COTTON STRIPPER

BACKGROUND OF THE INVENTION

1. Field of the Invention

This invention reletes to stalk shredders and more particularly to a stalk shredder attached to a cotton harvester.

2. Description of the Related Art

Cotton grown in the United States today is mechanically harvested. After the cotton is harvested, the stalks are cut or shredded.

Before my invention, attempts were made to combine the harvesting element and the stalk shredder. The harvesting element was carried by a vehicle having front and rear wheels. The harvesting element often was located between the front and rear wheels and the stalk shredder was mounted behind the rear wheels in these previous inventions. The device for elevating the harvested cotton to an overhead basket was usually mounted behind the rear wheels as well. The excessive weight behind the rear wheels tended to unbalance the vehicle.

HERNANDEZ, U.S. Pat. No. 4,461,139 discloses both the stalk shredder and the harvesting element between the front and rear wheels. The stalk shredder is located directly behind the harvesting element and attached thereto.

Also, before my invention, there were many "self propelled" cotton harvesters. These cotton harvesters are normally arranged with four ground engaging wheels. Normally the front wheels were power driven and the rear wheels are steerable. Harvesting elements are located forward of the front wheels and an operator cab is provided immediately behind the front wheels. Therefore the operator has an excellent view of the harvesting elements and their operation in harvesting the crop. The harvested cotton elevated to a basket or container located above the frame and engine of the "self propelled" harvester.

The applicant is unaware of a stalk shredder being placed upon the self propelled type harvester before his invention thereof.

SUMMARY OF THE INVENTION

1. Progressive Contribution to the Art

I have invented a stalk shredder, for use in self propelled harvesting machines where the harvesting elements are located on the frame forward of the ground engaging wheels.

The shredder elements are mounted on a bar between the front and rear wheels. A power lift raises and lowers the bar.

The stalks are cut by a rotating blade. One shredder unit is located directly behind each harvester element so that when the machine is moved through the field the shredder unit passes over the same stalks from which the harvester element harvested cotton.

This invention includes gauge wheels attached to each end of the shredder bar to maintain the bar and the shredder elements at a set height above the ground. These wheels are adjustable so that the distance from the ground to the shredder unit may be varied. The shredder unit's height may thus be varied independently of the harvester unit's height. The farmer finds it desirable that the shredder be capable of operation at a substantially different height than the height at which the harvester operates.

Thus it may be seen that the total function of my invention far exceeds the sum of the functions of the individual parts such as wheels, shafts, bars, etc.

2. Objects of this Invention

An object of this invention is to shred cotton stalks immediately after the cotton has been harvested therefrom.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawings, the different views of which are ot scale drawings.

Figure 1:
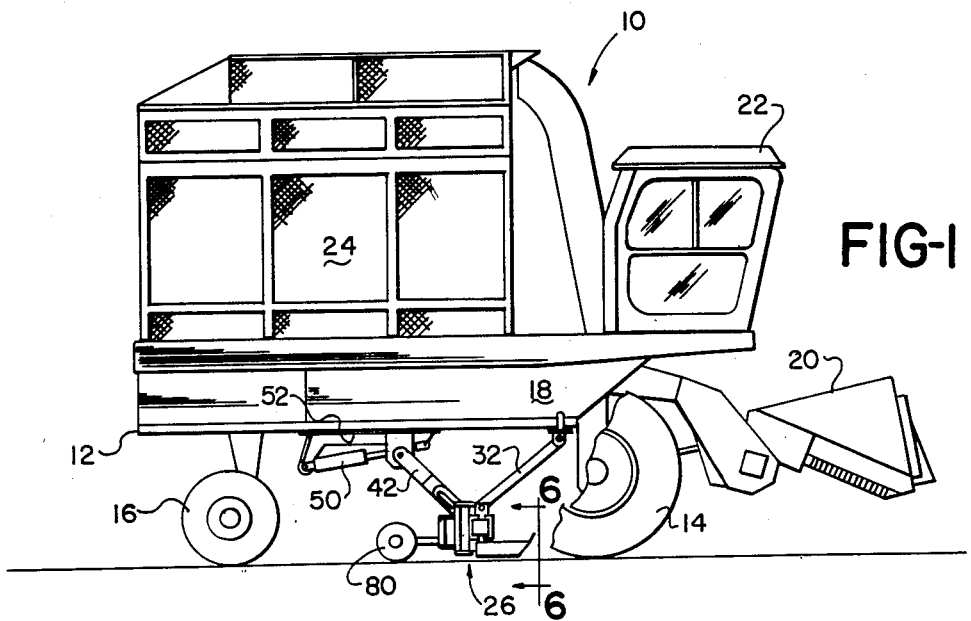
FIG. 1 is a side elevational view with some parts omitted and other parts broken away for clarity showing my invention.

As an aid to correlating the terms describing this invention to the exemplary drawing the following catalog of elements is provided:

CATALOG OF ELEMENTS 10 harvester
12 frame
14 forward ground engaging wheels
16 rear ground engaging wheels
18 power unit
20 cotton harvesting elements
22 operator's cab
24 storage means
26 shredder units
28 shredder bar
30 "U" bolts
32 support arms
34 pivot ears
36 clamps
38 ear
40 pitman
42 lift crank
44 bell crank
46 shaft
48 piston rod
50 hydraulic cylinder
52 frame bracket
54 forward plate
56 after plate
60 set screw 6 drive shaft
63 pillow blocks
64 shredder mounting brackets
66 hydraulic motor
68 sheave
70 "V" belts
72 sheave
74 right angle gear drive
76 shredder blade
78 vertically depending shaft
80 gauge wheel
82 vertical tube
84 pin
86 carriage
88 clamp
90 plate
92 slot
94 pin

DESCRIPTION OF THE PREFERRED EMBODIMENTS

Referring to the drawings and more particular to FIG. 1 there may be seen a typical self-propelled cotton harvester 10. The harvester will include frame 12. Forward ground engaging wheels 14 are journalled to the frame 12. Rear ground engaging wheels 16 are also journalled to the frame 12. In this particular type machine, the forward ground engaging wheels are driven from power unit 18 while the rear wheels are steered.

Cotton harvester units or elements 20 extend forward of the forward ground engaging wheels 14. Operator's cab 22 is located at the forward portion of the harvester 10 so that the operator in the cab has a good view of the harvesting elements 20. The harvesting elements 20 are powered from the power unit 18 as are the front drive wheels. Also the harvesting units can be raised and lowered by lift units. The cotton harvesting elements or units are the particular units which harvest the cotton from the stalk. Once it is harvested it is transferred by conventional means to a storage means 24 on the harvester 10.

Those having skill in the art will recognize and understand the harvester described to this point is old, well known and commercially availably on the market.

Shredder units 26 are attached to the frame 12 between the front wheels 14 and rear wheels 16. The units 26 are attached to shredder bar 28 which extends traversely across the harvester between the front and rear wheels. The units are attached by "U" bolts 30 or the like so that they can be longitudinally adjusted along the shredder bar 28 to match the rows of cotton.

Support arms 32 are pivoted ears 34 which are attached to the frame 12 about even with the front wheels which is forward of the shredder bar 28. They are attached rigidly to clamps 36 on the bar 28.

The rear portion of the clamp 36 includes ear 38 which is pivoted to pitman 40. The upper portion of the pitman 40 is pivoted to lift crank 42. Bell crank 44 connected by shaft 46 to the lift crank 42 is connected to the piston rod 48 of hydraulic cylinder 50.

Frame bracket 52 is attached to the frame 12 by suitable means. The shaft 46 is journalled through forward plate 54 of the frame bracket 52. Hydraulic cylinder 50 is pinned to after plate 56 of the frame bracket 52. Hydraulic cylinder 50 is connected by conventional means to a source of hydraulic fluid under pressure upon the harvester 10. It may be seen that the shredder bar 28 and thus the shredder units 26 may be raised and lowered by the control of hydraulic fluid to the hydraulic cylinder 50. Although only one clamp 36, ear 38, pitman 40, lift crank 42, bell crank 44, shaft 46, piston rod 48, hydraulic cylinder 50, and frame bracket 52 have been described in detail there are two, one on each side of the frame 12. Also they are in line with the two support arms 32.

The support arms 32 are connected to the shredder bar 28 by the clamps 36 rigidly but in an adjustable manner so that the shredder bar 28 may be adjusted about its axis. Therefore, if the shredder unit 26 is not positioned properly in a horizontal position the adjustment and particularly set screw 60 may be made so that the shredder unit 26 is in the proper position or angle to the ground to properly shred the stalks as determined by the farmer.

Drive shaft 62 is mounted upon the shredder bar 28 parallel thereto. The drive shaft is journalled by pillow blocks 63 to shredder mounting brackets 64 by which the shredder units 26 are mounted upon the shredder bar 28. The drive shaft 62 is directly coupled to hydraulic motor 66 so that the hydraulic motor 66 forms means for driving the drive shaft and thus the shredder units. The hydraulic motor is connected by conventional means to the source of hydraulic fluid under pressure all as is well known to those having skill in the art. Sheave 68 is attached to the drive shaft 62 at each shredder unit 26. Belts 70 extend around the sheave 68 and around sheave 72 on the shredder unit 26 to drive it. The shaft upon which the sheave 72 is mounted is horizontal. Right angle gear drive 74 is attached to the shredder unit so that the shredder blade 76 is mounted upon a vertically depending shaft 78 depending from the right angle gear drive 74. The drawings illustrate flat belts for clarity although three "V" belts are preferred.

Conventional shields are provided around the shredder blade 76 not only to protect workmen but also to prevent stalk parts and the like from being thrown indiscriminately.

Figure 5:
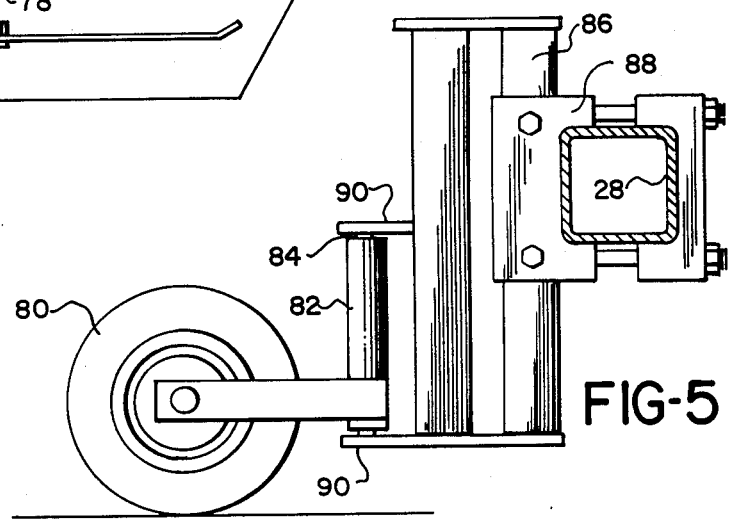
FIG. 5 is a sectional view taken substantially on line 5—5 of FIG. 6 showing the gauge wheel.
Figure 6:
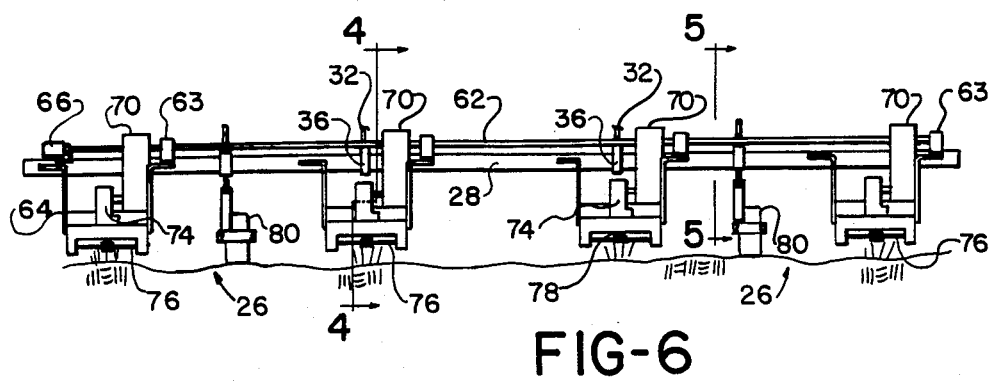
FIG. 6 is a rear view of a somewht schematic showing the shredder bar with the attachments thereto taken substantially on line 6—6 of FIG. 1.

Gauge wheel 80 is mounted on each end of the shredder bar 28. The gauge wheel is mounted upon vertical tube 82 which is free to rotate upon pin 84. Carriage 86 is mounted to slide vertically within clamp 88 which is clamped to the shredder bar 28. The carriage 68 in vertically adjustable within the clamp 88 as seen in FIG. 5. The pin 84 is held to the carriage 86 by two horizontal plates 90 one at the top of the pin 84 and the other at the bottom. The plates 90 re rigidly connected to the carriage 86. It will be understood that in operation the gauge wheels 80 determine the height at which the shredder 26 operates. The vertical tube 82 is mounted for rotation about a vertical axis so that in effect the gauge wheels 80 swivel to the shredder bar 28.

Therefore, by adjusting the height or the vertical adjustment of the vertical tube 82 the height of the shredder bar above the ground as determined by the gauge wheels is determined and thus the height of the shredder units. Stated otherwise, adjustment of the gauge wheels determine the height at which the cotton stalks are shredded.

Figure 2:
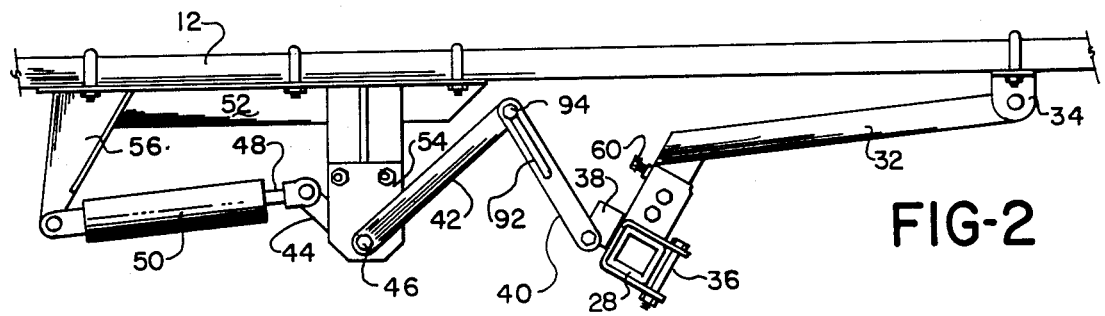
FIG. 2 is a side elevational view showing the shredder bar and its attachment with the power lift attached to the frame of the cotton harvester.
Figure 3:
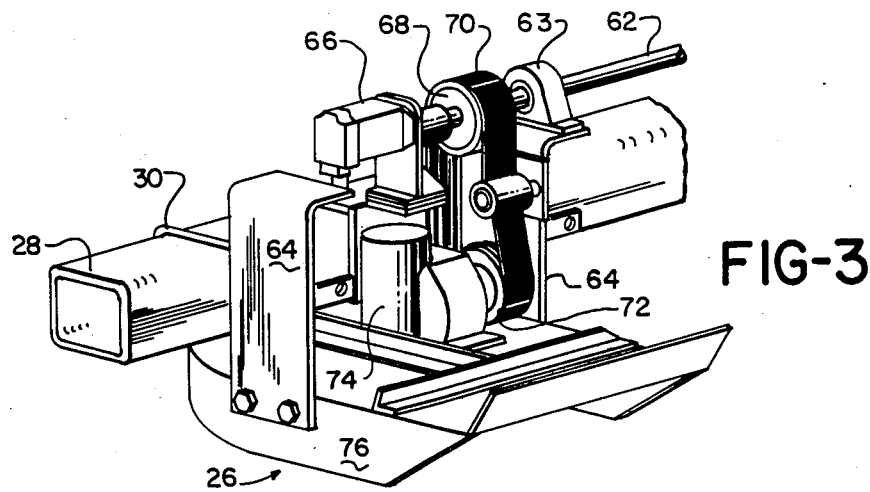
FIG. 3 is a perspective view of one shredder unit on the shredder bar with the hydraulic motor driving the drive shaft.
Figure 4:
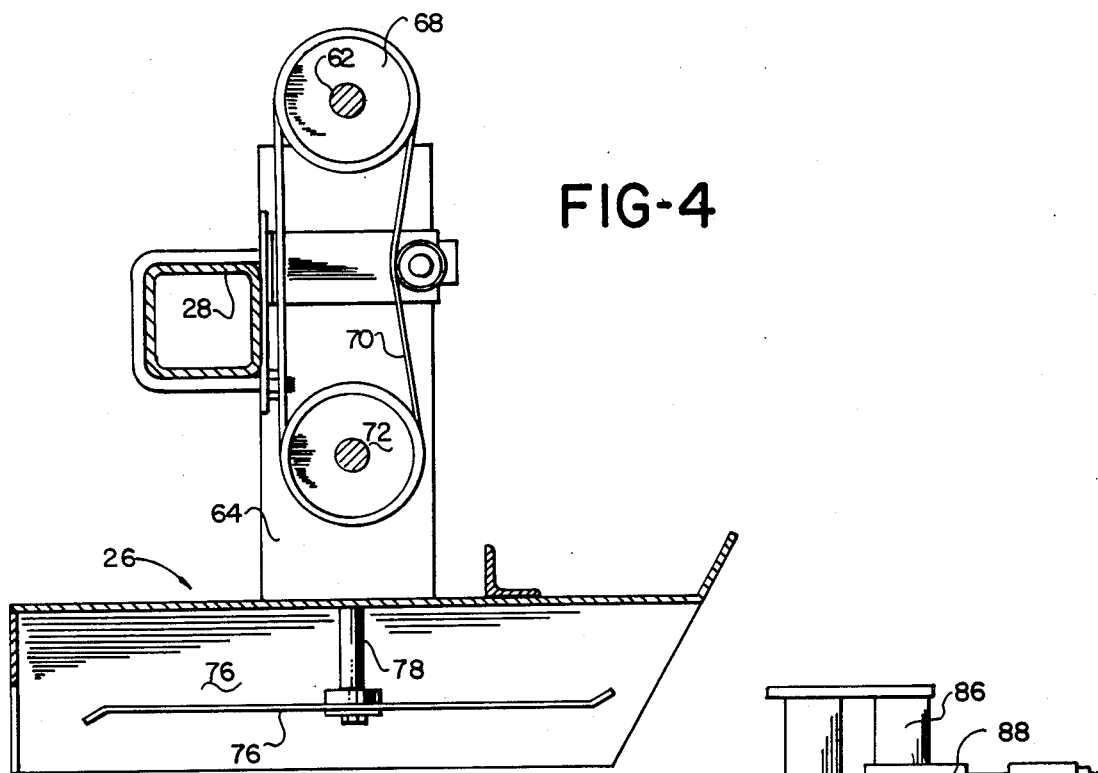
FIG. 4 is a sectional view taken substantially on line 4—4 of FIG. 6 showing the shredder unit.

Referring to FIG. 2, it may be seen that the pitman 40 has a longitudinal slot 92 therein and that the lift crank 42 is pivoted to the pitman 40 by pin 94 extending through the slot 92. It may be seen that to raise the shredder bar 28 and the shredder units 26 that the pin 94 will engage the top of the slot and lift the unit. However, when the unit is lowered the gauge wheels will engage the ground and the pin 94 will be in intermediate position within the slot 92. i.e., the lift cylinder 50 will only operate to lift the shredder units, but it will not operate to force the shredder units downward. Therefore, the gauge wheels 80 determine the downward movement of the shredder units.

The shredder units 26 follow directly behind the harvester units 20 so that immediately after the cotton is harvested from the row of stalks the shredder unit follows directly behind to shred the row of stalks.

The embodiment shown and described above is only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A machine for hrvesting four rows of cotton and shredding the stalks after harvest having
   a. a frame,
   b. two front ground engaging wheels on the frame,
   c. two rear ground engaging wheels on the frame,
   d. a power unit on the frame,
   e. wheel drive means attached from the power unit to the front ground engging wheels for moving the machine in a forward direction,
   f. a cotton harvesting element for each row forming means for harvesting cotton from cotton stalks on that row,
   g. the four cotton harvesting elements on the frame forward of the front ground engaging wheels, and
   h. storage means on said cotton harvesting machine for storing cotton harvested from the stalks;
   Wherein the Improved Structure Comprises:
   i. a horizontal traverse shredder bar between the front ground engaging wheels and the rear ground engaging wheels,
   j. a pivot ear attached to each side of the frame,
   k. a support arm pivoted to the pivot ear for supporting the shredder arm,
   l. adjustable clamps clamping the support arm to the shredder bar,
   m. a pitman pivoted to the clamp on the shredder bar,
   n. a lift crank pivoted to
   o. a frame bracket attached to the frame,
   p. said lift crank pivoted to the pitman,
   q. bell crank connected to the lift crank,
   r. a hydraulic cyliner connecting the bell crank to the frame bracket so that operation of the hydraulic cylinder will act to raise and lower the shredder bar,
   s. two gauge wheels,
   t. a carriage clamp attached to the shredder bar near each end of the shredder bar,
   u. a carriage vertically adjustable on the carriage clamp,
   v. one of said gauge wheels attached to each carriage,
   w. a shredder unit for shredding stalks for each row harvested,
   x. a shredder bracket for each shredder unit clamped to the shredder bar,
   y. said shredder unit attached to said shredder brackets,
   z. a right angle gear drive on each of said shredder unit,
   aa. a shredder blade attached to the right angle gear drive,
   bb. a drive shaft journalled to the shredder bar parallel thereto,
   cc. a drive belt at each shredder unit,
   dd. said drive belt interconnecting a sheave on the drive shaft with a sheave on the right angle gear drive, and
   ee. a hydraulic motor connected to said drive shaft.

2. The invention as defines in claim 1 with the addition of:
   ff. a pin upon carriage,
   gg. a tube journalled around said pin, and
   hh. said gauge wheel attached to said tube.

3. The invention as defines in claim 2 further comprising:
   ii. said pitman having a slot therein,
   jj. said lift crank being connected to said pitman by a pin extending through the slot.

* * * * *